United States Patent
Chiu et al.

(10) Patent No.: US 9,025,653 B1
(45) Date of Patent: May 5, 2015

(54) BLIND FREQUENCY DOMAIN INTERFERENCE AWARE CHIP-LEVEL EQUALIZATION

(71) Applicant: Broadcom Corporation, Irvine, CA (US)

(72) Inventors: Fu-Hsuan Chiu, Berkeley Heights, NJ (US); Kai Li, Highland Park, NJ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/064,643

(22) Filed: Oct. 28, 2013

(51) Int. Cl.
   *H04L 25/03* (2006.01)
   *H04L 25/02* (2006.01)

(52) U.S. Cl.
   CPC ...... *H04L 25/03159* (2013.01); *H04L 25/0204* (2013.01); *H04L 2025/03522* (2013.01)

(58) Field of Classification Search
   CPC .............. H04L 25/022; H04L 25/0238; H04L 25/03159; H04L 25/0204; H04L 2025/03522
   USPC .......... 375/142, 144, 147, 148, 150, 229, 232
   See application file for complete search history.

(56) References Cited

U.S. PATENT DOCUMENTS

2009/0111461 A1* 4/2009 Luschi et al. ................. 455/423
2012/0294350 A1* 11/2012 Allpress et al. ............... 375/229

* cited by examiner

*Primary Examiner* — Leon Flores
(74) *Attorney, Agent, or Firm* — Sterne, Kessler, Goldstein & Fox P.L.L.C.

(57) ABSTRACT

A frequency domain chip-level equalizer is disclosed. The equalizer includes an estimation module configured to generate a frequency domain estimate of an auto-correlation function of a received signal; and an equalization module configured to apply frequency domain equalization to the received signal using the frequency domain estimate of the auto-correlation function to generate frequency domain equalized samples of the received signal. The equalizer further includes an Inverse Fast Fourier Transform (IFFT) module configured to generate time domain equalized samples of the received signal from the frequency domain equalized samples.

20 Claims, 5 Drawing Sheets

BLIND FREQUENCY DOMAIN INTERFERENCE AWARE CHIP-LEVEL EQUALIZATION

TECHNICAL FIELD

The present disclosure relates generally to equalization, and more particularly to interference-aware frequency domain equalization (FDE)

BACKGROUND

Background Art

A chip-level equalizer is commonly used in receivers (e.g., High-Speed Downlink Packet Access (HSDPA)/Wideband Code Division Multiple Access (WCDMA) receivers) to mitigate Inter-Symbol Interference (ISI) due to multi-path channel and Multi-user Access Interference (MAI).

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
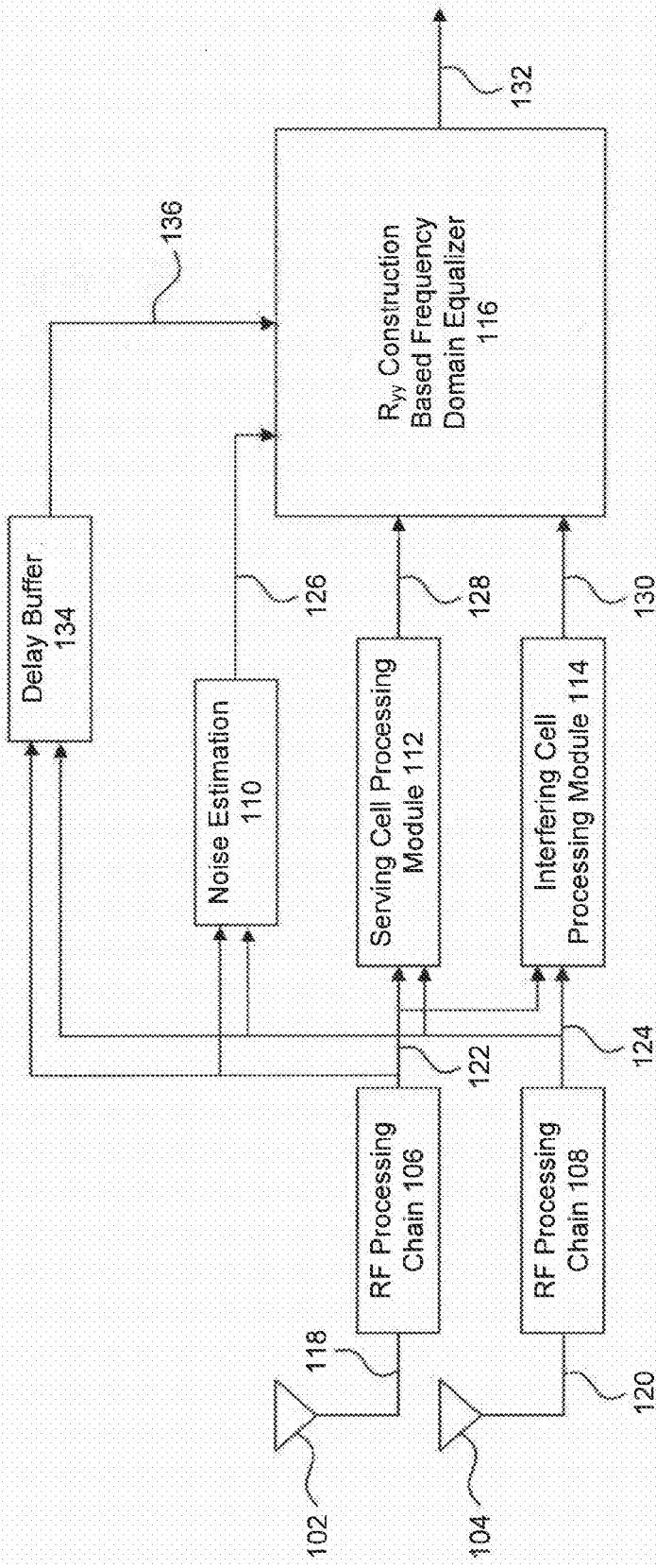
FIG. 1 illustrates an example receiver.

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

A chip-level equalizer is commonly used in receivers (e.g., High-Speed Downlink Packet Access (HSDPA)/Wideband Code Division Multiple Access (WCDMA) receivers) to mitigate Inter-Symbol Interference (ISI) due to a multi-path channel and Multi-user Access Interference (MAI).

Typically, the chip-level equalizer uses a system model that assumes that chips contained in a (spread spectrum) received signal are independent and identically distributed (i.i.d.). This means that chips can be modeled as random variables that have the same probability distribution function and that are independent of each other. Accordingly, the received signal (y) can be described mathematically as:

$$y = Hx + \sum_{i=1}^{N} G_i z_i + n \quad (1)$$

where H is a channel matrix representing the channel from a serving cell's transmitter to the receiver, x represents the serving cell's transmitted chips, $G_i$ is the channel matrix representing the channel from an i-th interfering cell's transmitter to the receiver, $z_i$ represents the i-th interfering cell's transmitted chips, N represents the total number of interfering cells present, and n represents noise.

The equalized received signal at the output of the chip-level equalizer can be described mathematically as:

$$W^H y = H^H \underbrace{(HH^H + \rho GG^H + \sigma^2 I)^{-1}}_{R_{yy}} y \quad (2)$$

where $W^H$ is a matrix of equalizer coefficients applied by the equalizer, $H^H$ represents the Hermitian transpose of the channel matrix H, G is a channel matrix from an interfering transmitter to the receiver, $G^H$ represents the Hermitian transpose of the channel matrix G, $\rho$ is a pilot channel loading ratio of the transmitter and the interfering transmitter, $\sigma^2$ represents noise power, and I represents an identity matrix.

Equation (2) provides the equalized received signal for an interference-aware equalizer assuming that a single interfering transmitter is present. This is reflected by a single $\rho GG^H$ term in equation (2). Similar $\rho GG^H$ terms can be added for each interfering transmitter if more than one interfering transmitter is present. The pilot channel loading ratio is a ratio of the pilot channel loading of the transmitter (percentage of total transmit power used by the transmitter to transmit a pilot channel used to estimate H) to the pilot channel loading of the interfering transmitter (percentage of total transmit power used by the interfering transmit a pilot channel used to estimate G). For example, the pilot channel loading can be the Common Pilot Channel (CPICH) loading. The term $(HH^H + \rho GG^H + \sigma^2 I)$ in equation (2) above represents an auto-correlation function of the received signal and is referred to as $R_{yy}$ herein.

Time domain chip-level equalization performs equalization in the time domain on the received signal. This requires inverting the $R_{yy}$ term in equation (2) above, a computationally demanding task. Frequency domain equalization has reduced complexity compared to time domain equalization. By approximating the channel matrices H and G using circular matrices, the processing is reduced to inverting diagonal matrices (a relatively simple task) as further described below.

Equation (3) below illustrates the approximation of a multi-path channel matrix H as a circular matrix. The multi-path channel is modeled as having a D+1 tap multi-path delay profile, represented by coefficients $h_0, h_1, \ldots, h_D$ in equation (3). Initially, the channel matrix H has an upper triangular portion equal to zero (the elements of the matrix above the main diagonal are zero). The approximation includes changing elements of the matrix H such that each row/column becomes a cyclic shift of the previous row/column as shown in equation (3).

$$H^{(ij)} = \begin{bmatrix} h_0^{ij} & 0 & \ldots & 0 & h_D^{ij} & \ldots & & h_1^{ij} \\ h_1^{ij} & h_0^{ij} & 0 & \ldots & 0 & \ddots & & h_2^{ij} \\ \vdots & \ddots & \ddots & \ddots & & \ddots & & \vdots \\ h_D^{ij} & & & & & 0 & & h_D^{ij} \\ 0 & h_D^{ij} & & & & & \ddots & 0 \\ & \ddots & \ddots & & & & \ddots & \vdots \\ \vdots & & & & & h_0^{ij} & & 0 \\ 0 & \ldots & & 0 & h_D^{ij} & \ldots & h_1^{ij} & h_0^{ij} \end{bmatrix} \quad (3)$$

Because it is circular, the Eigenvalue decomposition of the circular matrix approximation of H is equal to $F\Lambda F^H$, where F represents the Inverse Fast Fourier Transform (IFFT) matrix of H, $\Lambda$ is a diagonal matrix, and $F^H$ is the Fast Fourier Transform (FFT) matrix of H. This allows equation (2) above to be re-written as:

$$W^H y = F\Lambda^H F^H (F\Lambda F^H F\Lambda^H F^H + F\Gamma F^H F\Gamma^H F^H + \sigma^2 I)^{-1} y \quad (4)$$
$$= F(\Lambda^H (\Lambda\Lambda^H + \Gamma\Gamma^H + \sigma^2 I)^{-1}) F^H y$$

where $\Gamma$ is a diagonal matrix obtained by decomposing the circular matrix approximation of the channel matrix G. It is noted that in equation (4) the term $(\Lambda\Lambda^H + \Gamma\Gamma^H + \sigma^2 I)$ is a sum of diagonal matrices and is thus also a diagonal matrix. As a result, the term can be inverted by inverting element-wise the diagonal elements of a diagonal matrix. This is a significantly easier task than the inversion of the $R_{yy}$ term of equation (2) as done in time domain equalization, and provides frequency domain equalization an advantage over time domain equalization.

FIG. 1 illustrates an example receiver 100 which can be used to implement frequency domain equalization. Example receiver 100 is provided for the purpose of illustration only and is not limiting of embodiments. As further described below, example receiver 100 operates by constructing in the time domain the $R_{yy}$ term described above with reference to equation (2) and then applying processing as provided in equation (4) to generate the equalized received signal.

As shown in FIG. 1, example receiver 100 includes antennas 102 and 104, radio frequency (RF) processing chains 106 and 108, a noise estimation module 110, a serving cell processing module 112, an interfering cell processing module 114, and an $R_{yy}$ Construction-based Frequency Domain Equalizer 116, and a delay buffer 134. As would be understood by a person of skill in the art based on the teachings herein, example receiver 100 can include more or less components than shown in FIG. 1. For example, example receiver 100 can include more or less than two antennas and more or less than two RF processing chains. Also, example receiver 100 may include more than one interfering cell processing module 114 in the case that more than one interfering cell is being accounted for by the interference-aware equalizer.

In an embodiment, antennas 102 and 104 are configured to receive transmissions from a serving cell of example receiver 100 and from an interfering cell (e.g., nearby cell). Antennas 102 and 104 generate respectively input signals 118 and 120 in response to the received transmissions. Each of input signals 118 and 120 can be a composite of a transmission from the serving cell and a transmission from the interfering cell. As understood by a person of skill in the art, more than one interfering cells can be present and as such input signals 118 and 120 would include additional transmissions from interfering cells in addition to the transmission from the serving cell.

RF processing chains 106 and 108 can include, for example, low-noise filtering, down-conversion, and analog-to-digital conversion circuitry. RF processing chains 106 and 108 act respectively on input signals 118 and 120 to generate baseband input signals 122 and 124. Baseband input signals 122 and 124 are each provided to serving cell processing module 112, interfering cell processing module 114, and noise estimation module 110.

Serving cell processing module 112 is configured to track the serving cell of the receiver. In an embodiment, serving cell processing module 112 is configured to use input signals 122 and 124 to identify a transmission from the serving cell. In another embodiment, the transmission from the serving cell includes a pilot signal, and processing module 112 is configured to estimate a channel from the serving cell using the pilot signal. This channel corresponds to the channel matrix H described above with reference to equations (1)-(4). In another embodiment, service cell processing module 112 monitors a pilot channel from the serving cell in order to determine a pilot channel loading (e.g., CPICH loading) of the serving cell. The pilot channel loading represents the percentage of a total transmit power used by the serving cell to transmit the pilot signal. In an embodiment, serving cell processing module 112 provides the channel estimate and the pilot channel loading of the serving cell to equalizer 116 by means of an output signal 128.

Interfering cell processing module 114 is configured to track the interfering cell. In an embodiment, interfering cell processing module 114 is configured to use input signals 122 and 124 to identify the transmission from the interfering cell. In an embodiment, the transmission from the interfering cell includes a pilot signal, and processing module 114 is configured to estimate a channel from the interfering cell using the pilot signal. This channel corresponds to the channel matrix G described above with reference to equations (1)-(4). In another embodiment, interfering cell processing module 114 is configured to use input signals 122 and 124 to estimate a pilot channel loading (e.g., CPICH loading) of the interfering cell. The pilot channel loading represents the percentage of a total transmit power used by the interfering cell to transmit the pilot signal. Interfering cell processing module 114 provides the channel estimate and the pilot channel loading estimate of the interfering cell to equalizer 116 by means of an output signal 130.

Noise estimation module 110 is configured to use input signals 122 and 124 to estimate a noise power at example receiver 100. The noise power corresponds to the term $\sigma^2$ in equations (2) and (4) above. Noise estimation module 110 provides the noise power estimate to equalizer 116 by means of an output signal 126.

Delay buffer 134 is configured to receive input signals 122 and 124 and to delay them as necessary for noise estimation module 110, serving cell processing module 112, and/or interfering cell processing module to complete their respective processing and provide their respective output signals to equalizer 116. Delay buffer 134 then releases input signals 122 and 124 by means of an output signal 136 to equalizer 116. Output signals 126, 128, 130, and 136 provide equalizer 116 all the information necessary to construct the $R_{yy}$ term described above in equation (2). Accordingly, equalizer 116 can apply frequency domain processing as described above with reference to equations (3) and (4) to generate an equalized output signal 132.

Figure 2:
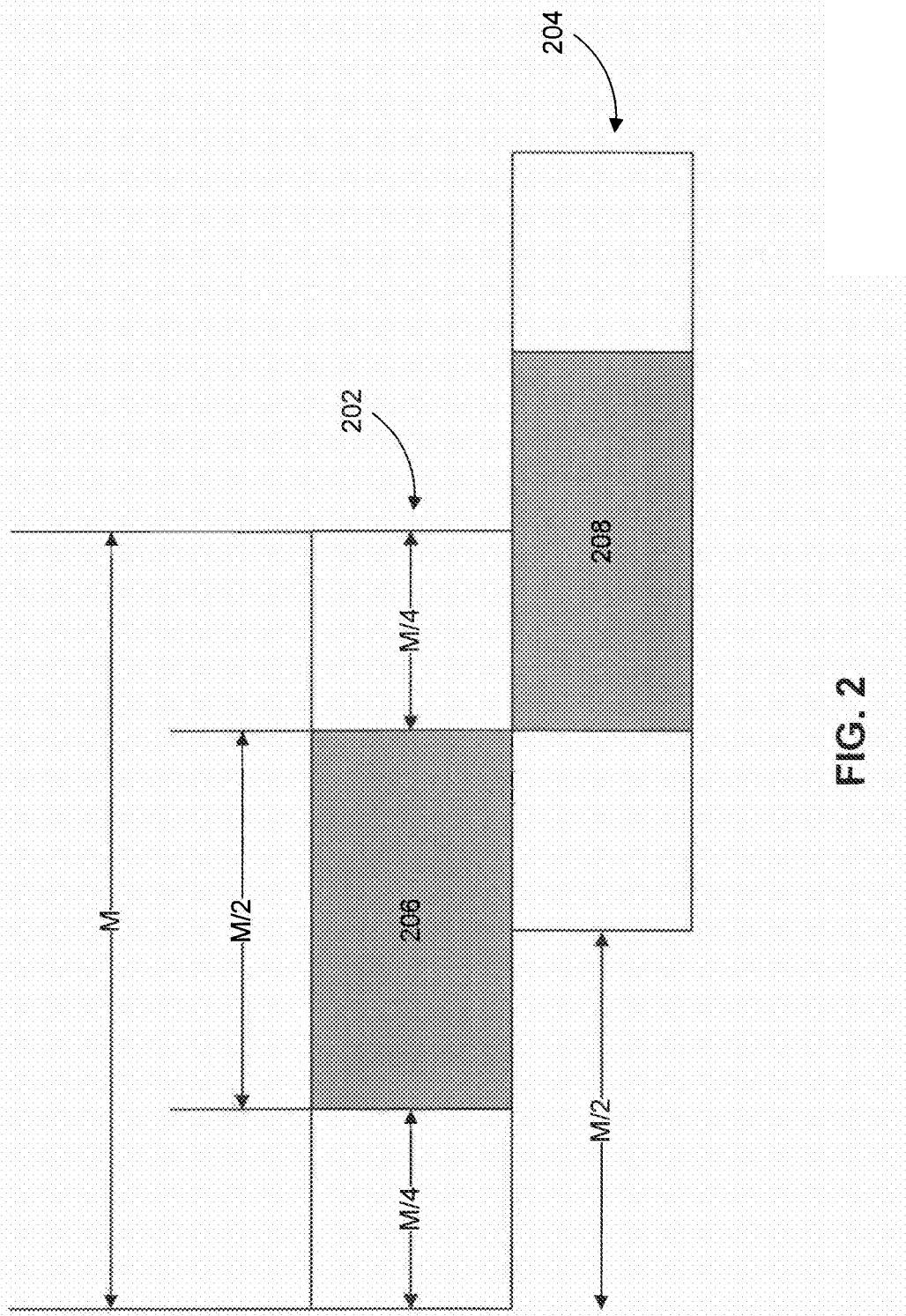
FIG. 2 is an example block processing approach.

As mentioned above, the frequency domain processing described above with reference to equations (3) and (4) depends on approximating the channel matrices H and G using circular matrices in order to diagonalize them using their respective FFT matrices. This approximation however introduces errors into equalized output signal 132. To reduce the errors, an overlap-and-cut block processing approach is used by equalizer 116 as illustrated in FIG. 2. At each processing iteration, a block of size M of the received signal (e.g., output signal 136 in example receiver 100) is formed. The block of size M overlaps with the block formed in the previous processing iteration by M/2. For example, as shown in example 200 of FIG. 2, a first block 202 is formed in a first processing iteration. In a subsequent processing iteration, a second block 204 that overlaps with first block 202 by the second M/2 half of first block 202 is formed. In each processing iteration, only a middle portion of size M/2 (e.g., portion 206 of first block 202, portion 208 of second block 204, etc.) of the formed block is acted upon by equalizer 116.

While the frequency domain equalization approach implemented by example receiver 100 is less resource intensive than time domain equalization, it also suffers from certain drawbacks. For example, the approach requires hardware/software resources to monitor the interfering cell (e.g., interfering cell processing module 114). This includes, among others, resources to track transmissions from the interfering cell to establish timing and frequency synchronization with the interfering cell; resources to estimate the channel from the interfering cell; and resources to estimate the pilot channel loading of the interfering cell. And these resources need to be duplicated or made available for each interfering cell that can interfere with receiver 100. Additionally, the approach requires hardware/software resources for noise estimation. As a result, the performance of the approach depends on accurate and reliable estimations of various parameters, which can still necessitate large resources at the receiver.

Embodiments of the present disclosure, as further described above, avoid the above-described $R_{yy}$ construction-based frequency domain equalization. Instead, the $R_{yy}$ term is estimated in the frequency domain directly from the received signal by exploiting the fact that the $R_{yy}$ term is a Toeplitz matrix (diagonal-constant matrix) with elements corresponding to the discrete auto-correlation function of the received signal. As such, the frequency domain representation of $R_{yy}$ can be obtained from element-wise multiplication of the received signal and its conjugate. Specifically, embodiments exploit the following relationship between the circular correlation and the circular convolution of two signals:

$$F^H(a \circ b) = F^H(a^* \otimes b) = F^H(a^*) \bullet F^H(b) = A^* \bullet B \quad (5)$$

where $F^H$ represents the Fast Fourier Transform, a and b represent time domain signals, a* represents the conjugate of a, ∘ is the circular correlation operator, ⊗ is the circular convolution operator, ● is the element-wise multiplication operator, A is the frequency domain representation of a, A* is the conjugate of A, and B is the frequency domain representation of B. When applied to the problem of estimating the $R_{yy}$ term (by replacing both a and b by the received signal y in equation (5)), equation (5) provides that the frequency domain representation of the $R_{yy}$ term is equal to the element-wise multiplication of the received signal by its conjugate in the frequency domain.

Figure 3:
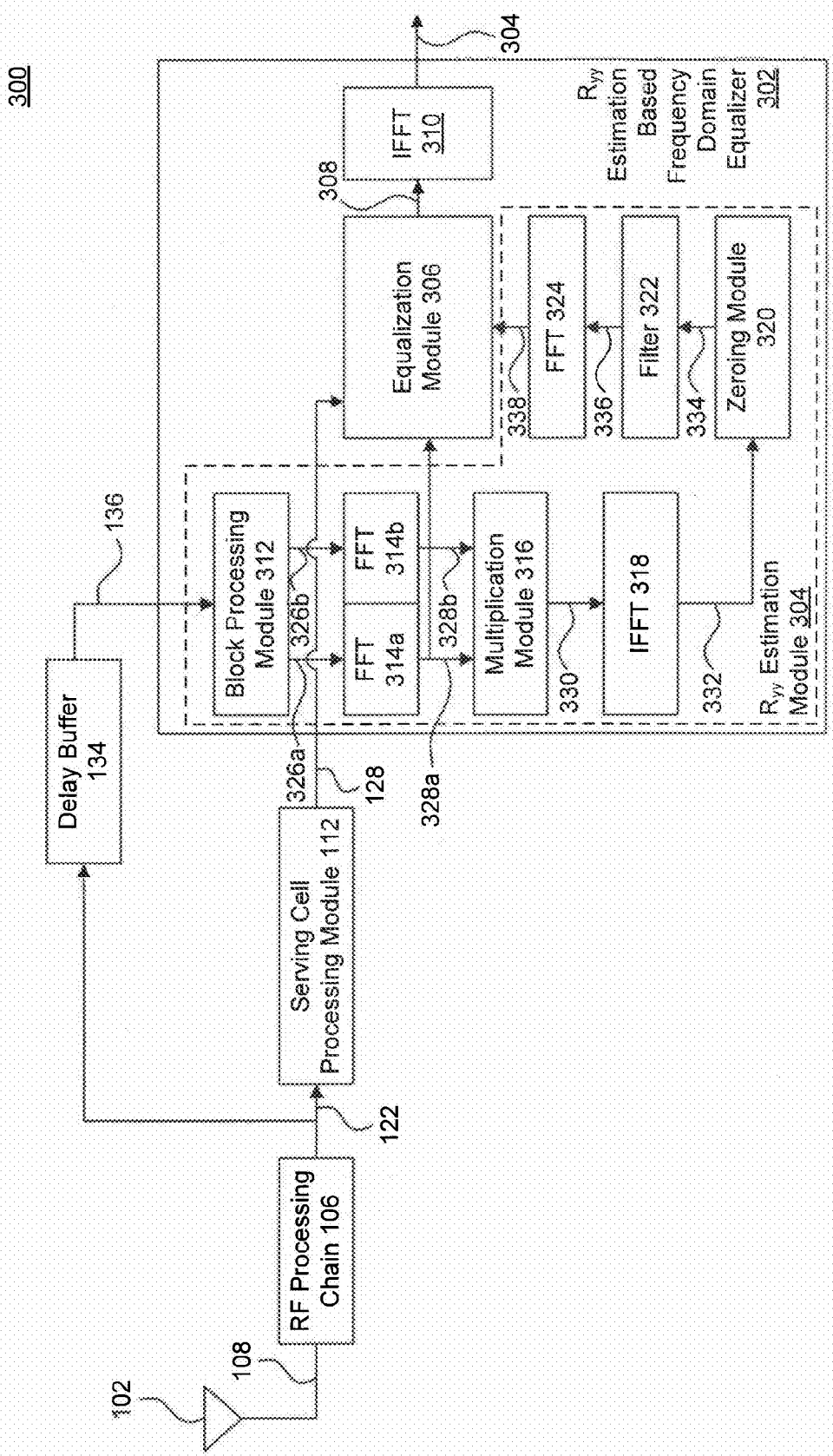
FIG. 3 illustrates an example receiver according to an embodiment.

FIG. 3 illustrates an example receiver 300 according to an embodiment. Example receiver 300 is provided for the purpose of illustration only and is not limiting of embodiments. Example receiver 300 can be used to implement $R_{yy}$ estimation-based frequency domain equalization. As shown in FIG. 3, example receiver 300 includes an antenna 102, an RF processing chain 106, a serving cell processing module 112, a delay buffer 134, and an $R_{yy}$ estimation-based frequency domain equalizer 302.

Antenna 102, RF processing chain 106, serving cell processing module 112, and delay buffer 134 are as described above with reference to FIG. 1. Specifically, in an embodiment, a signal is received by antenna 102 and is RF processed by RF processing chain 106 to generate input signal 122. Processing module 112 is configured to generate a channel estimate of a channel from a serving cell of example receiver 300 using input signal 122. In an embodiment, the channel is a multi-path channel, and the channel estimate approximates the channel using a circular matrix as described above. Processing module 112 provides the channel estimate to equalizer 302 by means of an output signal 128. Equalizer 302 also receives output signal 136 from delay buffer 134, which includes a delay version of input signal 122.

Equalizer 302 is a chip-level equalizer configured to equalize chips of the received signal. In an embodiment, equalizer 302 is configured to generate a frequency domain estimate of an auto-correlation function of the received signal (represented by output signal 136) and to equalize the received signal using the channel estimate (received from processing module 112) and the generated frequency domain estimate of the auto-correlation function. In an embodiment, equalizer 302 includes an $R_{yy}$ estimation module 304, an equalization module 306, and an IFFT module 310.

Estimation module 304 is configured to receive the received signal, represented by output signal 136, and to generate a frequency domain estimate 338 of the auto-correlation function of the received signal. In an embodiment, estimation module 304 includes a block processing module 312, FFT modules 314a and 314b, a multiplication module 316, an IFFT module 318, a zeroing module 320, a filter 322, and a FFT module 324. In another embodiment, filter 322 can be optional.

In an embodiment, at each processing iteration, block processing module 312 is configured to form a first block 326a and a second block 326b from the received signal represented by output signal 136, where first block 326a comprises M samples (M being an integer) of the received signal and M padding zeros and second block 326b comprises 2M samples of the received signal (including the same M samples of first block 326a). A sliding window equal to M is applied for each subsequent processing iteration.

Figure 4:
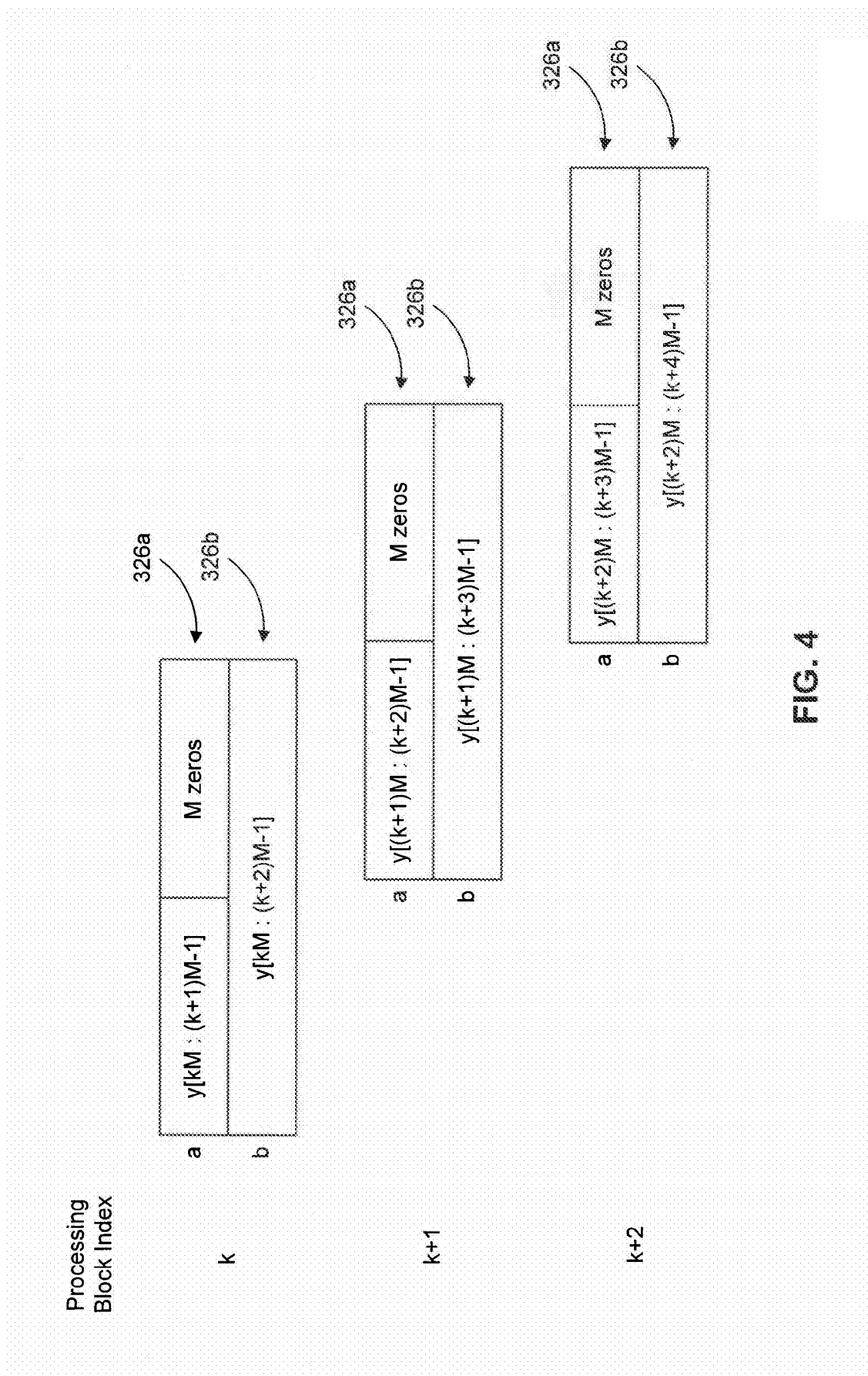
FIG. 4 illustrates example block processing according to an embodiment.

Example block processing by block processing module 312 is illustrated in FIG. 4. As shown in FIG. 4, at processing iteration k, first block 326a is formed using M samples (represented by the vector y[kM:(k+1)M−1]) of the received signal followed by M padding zeros. Second block 326b is formed using 2M samples (represented by the vector y[kM:(k+2)M−1]) of the received signal that overlap with the M samples of first block 326a. At processing iteration k+1, first block 326a is formed by sliding the first block of processing iteration k by M. As such, first block 326a at iteration k+1 includes the second half M samples of second block 326b of processing iteration k, followed by M padding zeros. Similarly, second block 326b is formed by sliding the second block of processing iteration k by M. Similar processing is applied for subsequent processing iterations as shown for processing iteration k+2, for example.

First and second blocks 326a and 326b are provided respectively to FFT modules 314a and 314b. FFT modules 314a and 314b act on first and second blocks 326a and 326b respectively to generate frequency domain representation signals 328a and 328b of first and second blocks 326a and 326b.

Signals 328a and 328b provided to multiplication module 316, which performs an element-wise multiplication of signals 328a and 328b to generate a third block 330. Third block 330 represents an element-wise frequency domain multiplication of first block 326a and second block 326b.

Subsequently, third block 330 is acted upon by IFFT module 318 to generate a time domain representation signal 332 of third block 330. Signal 332 is then provided to zeroing module 320, which acts to set to zero a second half of time domain representation signal 332 to generate a fourth block 334. Fourth block 334 can be optionally filtered by filter 322 to generate a filtered fourth block 336, which is then processed by FFT module 324 to generate a frequency domain estimate 338 of the auto-correlation function of the received signal. In an embodiment, the frequency domain estimate 338 produced by FFT module 324 corresponds to the term $(\Lambda\Lambda^H + \Gamma\Gamma^H + \sigma^2 I)$ in equation (4) above.

Frequency domain estimate 338 is then provided to equalization module 306. Equalization module 306 is configured to apply frequency domain equalization to the received signal, represented by output signal 136, using the channel estimate (received from processing module 112) and frequency domain estimate 338 to generate frequency domain equalized samples 308 of the received signal.

In an embodiment, equalization module 306 is configured to receive frequency domain representation signal 328a from FFT module 314a of estimation module 304. As described above, frequency domain representation signal 328b includes a frequency domain representation of first block 326a, which is composed of M samples of the received signal and M padding zeros. In an embodiment, equalization module 306 generates a frequency domain representation of the received signal by decimating signal 328b (because signal 328b represents an interpolation of the frequency domain representation of the received signal). Then, equalization module 306 decomposes the channel estimate received from processing module 112. In an embodiment, the channel estimate is a circular matrix approximation of the channel and equalization module 306 is configured to decompose the channel estimate according to $F\Lambda F^H$, where F represents the IFFT matrix of the channel estimate, $\Lambda$ is a diagonal matrix, and $F^H$ is the FFT matrix of the channel estimate. Equalization module 306 then inverts frequency domain estimate 338 of the auto-correlation function and multiplies it by the Hermitian transpose of the diagonal matrix $\Lambda$ ($\Lambda^H$). The resulting product of the multiplication is then multiplied by the frequency domain representation of the received signal to generate frequency domain equalized samples 308. This effectively equalizes the received signal in the frequency domain.

Frequency domain equalized samples 308 are then provided to IFFT module 310, which generates time domain equalized samples 340 of the received signal from frequency domain equalized samples 308. Subsequent processing of samples 340 can then include de-scrambling and despreading when the samples have been scrambled and code spread at the transmitter.

Figure 5:
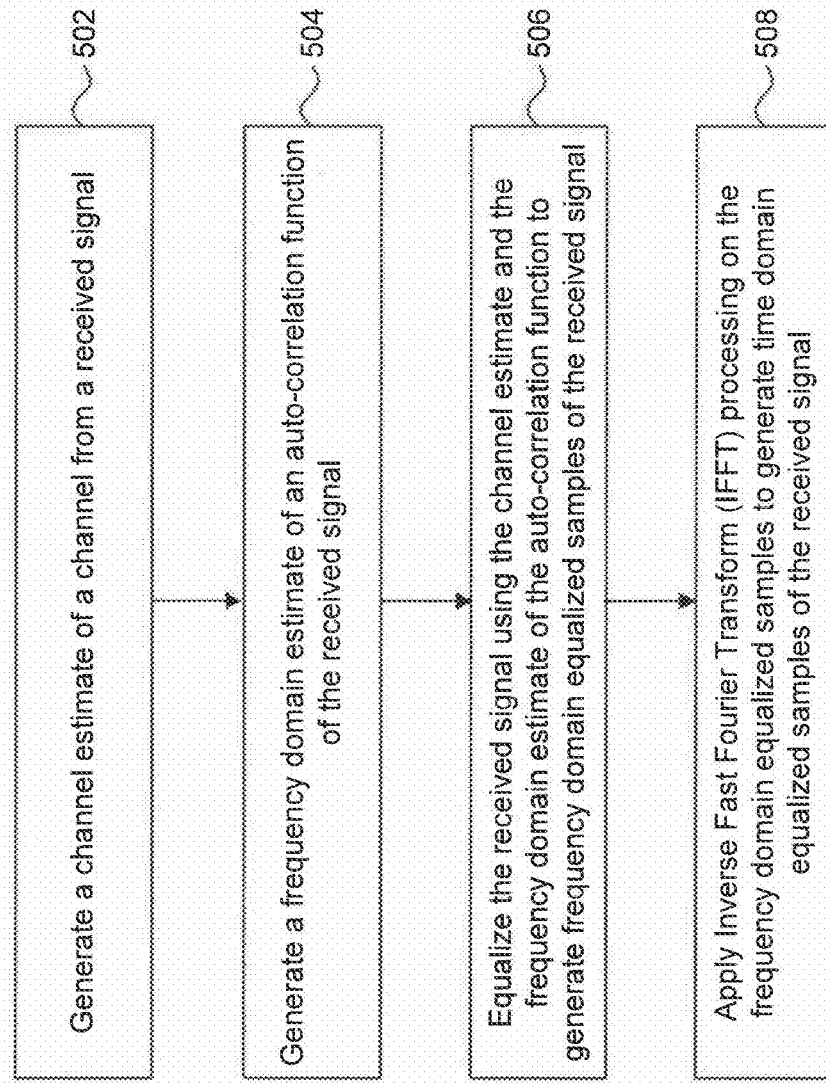
FIG. 5 illustrates an example process according to an embodiment.

FIG. 5 illustrates an example process 500 according to an embodiment. Example process 500 is provided for the purpose of illustration only and is not limiting of embodiments. Example process 500 can be performed by a receiver such as example receiver 300 described above.

As shown in FIG. 5, example process 500 begins in step 502, which includes generating a channel estimate of a channel from a received signal. In an embodiment, the received signal is from a serving cell of the receiver and the channel estimate estimates the channel from the serving cell to the receiver. In another embodiment, the channel is a multi-path channel, and the channel estimate approximates the channel using a circular matrix. In an embodiment, the received signal includes a pilot signal that is used to estimate the channel.

Subsequently, process 500 proceeds to step 504, which includes generating a frequency domain estimate of an auto-correlation function of the received signal. In an embodiment, step 504 further includes forming a first block and a second block from the received signal, the first block comprising M samples of the received signal and M padding zeros and the second block comprising 2M samples of the received signal, wherein M is an integer; performing an element-wise frequency domain multiplication of the first block and the second block to generate a third block; setting to zero a second half of a time domain representation of the third block to generate a fourth block; and applying FFT processing on the fourth block to generate the frequency domain estimate of the auto-correlation function.

Process 500 then proceeds to step 506, which includes equalizing the received signal using the channel estimate and the frequency domain estimate of the auto-correlation function to generate frequency domain equalized samples of the received signal. In an embodiment, step 506 further includes decomposing the channel estimate to generate a diagonal matrix; generating a product of the diagonal matrix and an inverse of the frequency domain estimate of the auto-correlation function; and multiplying the generated product by a frequency domain representation of the received signal to generate the frequency domain equalized samples. In an embodiment, because the channel estimate is a circular matrix, it can be diagonalized by the FFT matrix and decomposed as $F\Lambda F^H$, where F represents the IFFT matrix of the channel estimate, $\Lambda$ is a diagonal matrix, and $F^H$ is the FFT matrix of the channel estimate. In another embodiment, the generated frequency domain estimate of the auto-correlation function is a diagonal matrix and can be readily inverted to generate the inverse by inverting element-by-element its diagonal elements.

Process 500 terminates in step 508, which includes applying IFFT processing on the frequency domain equalized samples to generate time domain equalized samples of the received signal.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A receiver, comprising:
a processing module configured to generate a channel estimate of a channel from a received signal; and
a frequency domain equalizer (FDE) configured to generate a frequency domain estimate of an auto-correlation function of the received signal and to equalize the received signal using the channel estimate and the frequency domain estimate of the auto-correlation function, wherein the equalization of the received signal includes inverting the frequency domain estimate of the auto-correlation function by inverting a diagonalized representation of the frequency domain estimate of the auto-correlation function.

2. The receiver of claim 1, wherein the channel is from a serving cell to the receiver.

3. The receiver of claim 1, wherein the channel is a multi-path channel.

4. The receiver of claim 3, wherein the channel estimate approximates the channel using a circular matrix.

5. The receiver of claim 1, wherein the FDE comprises:
an estimation module configured to generate the frequency domain estimate of the auto-correlation function from the received signal; and
an equalization module configured to apply frequency domain equalization to the received signal using the channel estimate and the frequency domain estimate to generate frequency domain equalized samples of the received signal.

6. The receiver of claim 5, wherein the FDE further comprises:
an Inverse Fast Fourier Transform (IFFT) module configured to generate time domain equalized samples of the received signal from the frequency domain equalized samples.

7. The receiver of claim 5, wherein the estimation module comprises:
a block processing module configured to form a first block and a second block from the received signal, the first block comprising M samples of the received signal and M padding zeros and the second block comprising 2M samples of the received signal, wherein M is an integer;
a multiplication module configured to perform an element-wise frequency domain multiplication of the first block and the second block to generate a third block;
a zeroing module configured to set to zero a second half of a time domain representation of the third block to generate a fourth block; and
a Fast Fourier Transform (FFT) module configured to apply FFT processing on the fourth block to generate the frequency domain estimate of the auto-correlation function.

8. The receiver of claim 5, wherein the equalization module is further configured to:
decompose the channel estimate to generate a diagonal matrix;
generate a product of the diagonal matrix and an inverse of the frequency domain estimate of the auto-correlation function; and
multiply the generated product by a frequency domain representation of the received signal to generate the frequency domain equalized samples.

9. The receiver of claim 8, wherein the equalization module is further configured to receive the frequency domain representation of the received signal from the estimation module.

10. The receiver of claim 1, wherein the FDE is a chip-level equalizer configured to equalize chips of the received signal.

11. A method, comprising:
generating a channel estimate of a channel from a received signal;
generating a frequency domain estimate of an auto-correlation function of the received signal; and
equalizing the received signal using the channel estimate and the frequency domain estimate of the auto-correlation function to generate frequency domain equalized samples of the received signal, wherein equalizing the received signal includes inverting the frequency domain estimate of the auto-correlation function by inverting a diagonalized representation of the frequency domain estimate of the auto-correlation function.

12. The method of claim 11, wherein the channel is a multi-path channel.

13. The receiver of claim 12, wherein the channel estimate approximates the channel using a circular matrix.

14. The method of claim 11, further comprising:
applying Inverse Fast Fourier Transform (IFFT) processing on the frequency domain equalized samples to generate time domain equalized samples of the received signal.

15. The method of claim 11, further comprising:
forming a first block and a second block from the received signal, the first block comprising M samples of the received signal and M padding zeros and the second block comprising 2M samples of the received signal, wherein M is an integer;
performing an element-wise frequency domain multiplication of the first block and the second block to generate a third block;
setting to zero a second half of a time domain representation of the third block to generate a fourth block; and
applying Fast Fourier Transform (FFT) processing on the fourth block to generate the frequency domain estimate of the auto-correlation function.

16. The method of claim 11, further comprising:
decomposing the channel estimate to generate a diagonal matrix;
generating a product of the diagonal matrix and an inverse of the frequency domain estimate of the auto-correlation function; and
multiplying the generated product by a frequency domain representation of the received signal to generate the frequency domain equalized samples.

17. An equalizer, comprising:
an estimation module configured to receive a signal and to generate a frequency domain estimate of an auto-correlation function of the received signal from the received signal; and
an equalization module configured to apply frequency domain equalization to the received signal using the frequency domain estimate of the auto-correlation function to generate frequency domain equalized samples of the received signal, wherein the equalization module is further configured to invert the frequency domain estimate of the auto-correlation function by inverting a diagonalized representation of the frequency domain estimate of the auto-correlation function.

18. The equalizer of claim 17, further comprising:
an Inverse Fast Fourier Transform (IFFT) module configured to generate time domain equalized samples of the received signal from the frequency domain equalized samples.

19. The equalizer of claim 17, wherein the estimation module comprises:

a block processing module configured to form a first block and a second block from the received signal, the first block comprising M samples of the received signal and M padding zeros and the second block comprising 2M samples of the received signal, wherein M is an integer;

a multiplication module configured to perform an element-wise frequency domain multiplication of the first block and the second block to generate a third block;

a zeroing module configured to set to zero a second half of a time domain representation of the third block to generate a fourth block; and a Fast Fourier Transform (FFT) module configured to apply FFT processing on the fourth block to generate the frequency domain estimate of the auto-correlation function.

20. The equalizer of claim 17, wherein the received signal is received over a channel, and wherein the equalization module is further configured to:

decompose a channel estimate of the channel to generate a diagonal matrix;

generate a product of the diagonal matrix and an inverse of the frequency domain estimate of the auto-correlation function; and multiply the generated product by a frequency domain representation of the received signal to generate the frequency domain equalized samples.

* * * * *